(12) United States Patent
Koshigoe et al.

(10) Patent No.: US 7,749,613 B2
(45) Date of Patent: Jul. 6, 2010

(54) MULTILAYER BRAZE-ABLE SHEET

(75) Inventors: Fumihiro Koshigoe, Tochigi (JP);
Akihiro Tsuruno, Tochigi (JP); Toshiki Ueda, Tochigi (JP); Stephen F. Baumann, Lancaster, PA (US)

(73) Assignees: Alcoa Inc., Pittsburgh, PA (US); Kobe Steel Ltd., Kobe, Hyogo (JP)

( * ) Notice: Subject to any disclaimer, the term of this patent is extended or adjusted under 35 U.S.C. 154(b) by 1059 days.

(21) Appl. No.: 11/379,587

(22) Filed: Apr. 21, 2006

(65) Prior Publication Data

US 2007/0246509 A1    Oct. 25, 2007

(51) Int. Cl.
*B32B 15/20* (2006.01)
(52) U.S. Cl. .................. 428/654; 428/933; 165/905; 228/262.51
(58) Field of Classification Search .......... None
See application file for complete search history.

(56) References Cited

U.S. PATENT DOCUMENTS

| | | | |
|---|---|---|---|
| 5,011,547 A | 4/1991 | Fujimoto et al. | |
| 5,292,595 A | 3/1994 | Yamauchi et al. | |
| 5,350,436 A | 9/1994 | Takezoe et al. | |
| 5,564,619 A | 10/1996 | Childree | |
| 5,744,255 A * | 4/1998 | Doko et al. | 428/654 |
| 6,261,706 B1 | 7/2001 | Fukuda et al. | |
| 6,555,251 B2 | 4/2003 | Kilmer | |
| 6,667,115 B2 | 12/2003 | Goodrick | |
| 6,911,267 B1 | 6/2005 | Goodrick | |
| 2002/0037426 A1 * | 3/2002 | Yamada et al. | 428/654 |

FOREIGN PATENT DOCUMENTS

| | | |
|---|---|---|
| EP | 1666190 | 6/2006 |
| EP | 1795294 | 6/2007 |
| EP | 1795295 | 6/2007 |
| JP | 03008569 | 1/1991 |
| JP | 04036600 A * | 2/1992 |
| JP | 04318141 | 11/1992 |
| JP | 09316578 | 12/1997 |
| JP | 2003293064 | 10/2003 |
| JP | 2007152421 | 6/2007 |

(Continued)

OTHER PUBLICATIONS

English translation of Yamauchi et al., Document JP04036600, Published Feb. 2, 1992.*
International Search Report and Written Opinion of the International Searching Authority relating to International Application No. PCT/US2006/061151, mailed from the European Patent Office on Oct. 13, 2008.

(Continued)

*Primary Examiner*—Jennifer McNeil
*Assistant Examiner*—Adam C Krupicka

(57) ABSTRACT

A multi-layer aluminum brazing sheet including a core layer, interliner, braze clad layer and a sacrificial layer, in which the post-braze strength of the brazing sheet is optimized by controlling the manganese (Mn), silicon (Si), copper (Cu) and magnesium (Mg) contents of the core layer and the Mn, Si and Cu content of the interliner and the Mn, Si and Zn content of the sacrificial layer and the specifics of the braze thermal cycle. The brazing sheet maintains corrosion resistance, while optimizing post-braze strength, by utilizing 0.5 wt. % to 1.2 wt. % Cu in the interliner. Further, the interliner and sacrificial layer of the brazing sheet contain low or no magnesium to maintain the brazing sheet's braze-ability.

14 Claims, 1 Drawing Sheet

FOREIGN PATENT DOCUMENTS

| | | |
|---|---|---|
| JP | 2007152422 | 6/2007 |
| WO | 03089237 | 10/2003 |
| WO | 2005028153 | 3/2005 |

OTHER PUBLICATIONS

Metals Handbook, Sep. 1987, 3, vol. 13-9th Edition, ASM International, United States.

* cited by examiner

MULTILAYER BRAZE-ABLE SHEET

FIELD OF THE INVENTION

The invention relates to a multiple layer brazing sheet that is braze-able with a controlled atmosphere brazing process using a fluoride based flux and provides improved post braze strength while maintaining the corrosion resistance of the sheet.

BACKGROUND OF THE INVENTION

Joining of aluminum by brazing is a well known process due to the strong and uniform joints that can be produced between aluminum parts of varying shapes and types. A commercially important brazing process today is the Controlled Atmosphere Brazing process hereinafter the CAB process. As the name implies, the CAB process is performed in a furnace with a controlled atmosphere having low oxygen and moisture content to minimize oxidation of aluminum at elevated temperatures. In the CAB process, aluminum parts to be joined are formed, sometimes cleaned, fluxed and then brazed at temperatures close to 600° C. The CAB process requires melting of a filler metal, typically a 4XXX series (Al—Si) aluminum alloy that has a lower melting temperature than the aluminum parts that are being joined. The filler metal can be added as foil between the aluminum parts being joined, as a powder in a paste placed near joint locations, or it can be present as an integral part of the pieces being joined if the pieces are fabricated from a clad product commonly known as an aluminum brazing sheet. The role of flux, which melts prior to the filler metal, is to lift or dissolve the oxide layer on the aluminum parts and to further protect the underlying metal preventing re-oxidation. One example of a family of fluxes suitable for the CAB brazing is inorganic fluoride fluxes, such as potassium fluoro-aluminates. One widely used commercial flux of this type is the Nocolok® family of fluxes. Nocolok is a registered trademark of Alcan Aluminum Ltd of Canada.

It remains a challenge today to generate high strength in CAB brazed aluminum parts, wherein high strength generally refers to ultimate tensile strength (UTS) values of 190 MPa or greater. Recrystallization of an aluminum core alloy removes any prior strengthening from deformation, and most solute additions to the aluminum core alloys offer only modest strength increases. It is well known, however, that combinations of solutes in aluminum can result in precipitation hardening under certain conditions of concentration and thermal history. One particularly effective pair of solutes is Magnesium and Silicon, which can combine to form very small precipitates that strengthen the aluminum parts. This is commonly called age-hardening. When the precipitation occurs at room temperature it is called "natural aging" and at elevated temperatures "artificial aging". Under the right conditions Cu can also participate in age hardening reactions with Mg and Si by forming Al—Cu—Mg or Al—Cu—Mg—Si compounds as small strengthening precipitates.

While Si is a common element in aluminum braze alloys and is often present in the AA3XXX alloys commonly used as the core layer of aluminum brazing sheet, Mg is often restricted in brazing alloys used in the CAB process. This is due to the known detrimental effect Mg has on Nocolok® type fluxes. Mg interacts with the flux in a way that has a negative impact on brazing performance. Nocolok flux has a low solvating capacity for MgO and the flux reacts with Mg and MgO to form magnesium fluorides which raise the melting point of the flux and reduce its activity. If Mg is present in the core layer in high enough concentrations (sometimes even as little as 0.1% can be detrimental) it can diffuse into a braze liner during the CAB process to interact with the flux. One strategy of taking advantage of Mg, while still maintaining good brazing performance in the CAB process, has been to incorporate Mg into a liner on the opposite side of the core from the braze liner. This liner is called a water-side liner or sacrificial layer because it will contact the coolant in a engine cooling circuit. Further, with a proper choice of composition the sacrificial layer can also provide cathodic protection to the underlying core alloy and thus help minimize the severity of internal corrosion attack on the tube in service. This strategy of incorporating Mg in the sacrificial layer is very effective for welded tubes where the edges of tubestock strip get seam welded together. The thick core of the tubestock provides a sufficient diffusion barrier for the Mg so that it does not reach the filler metal or flux during the brazing operation.

Different tube designs, however, can be used to provide tubes of additional strength. These designs call for folding tubestock into a configuration that allows for the tube to have a central web along the mid-depth of the tube, separating the tube into two parallel flow channels. These are sometimes referred to as B-tube configurations because of their appearance in crossection. However, for B-tube configurations, the use of a high Mg sacrificial layer will interfere with good braze joint formation at locations where the braze filler metal needs to wet the internal sacrificial layer.

To solve this problem, U.S. Pat. No. 6,555,251 to Kilmer isolated the Mg-bearing core from both the braze clad layer and the sacrificial layer by using a four-layer tubestock construction. In this construction a Mg-bearing core was bounded on both surfaces by Mg-free interliners. A key feature of this later invention was that one or both of the interliners was higher in Si than the core alloy. A second key feature of that design was the use of modest Cu levels (up to about 0.3%) in the first interliner (the layer between the braze layer and the core) believed to establish a corrosion potential gradient that would be favorable for external corrosion resistance of the tube. Kilmer reported post-braze Ultimate Tensile Strength (UTS) values approaching 150 MPa after 30 days of natural aging, and UTS as high as 210 MPa after significant time at elevated temperature (30 days at 90° C.).

In light of the above, there remains a need in the art for tubestock materials with excellent braze-ability, that achieve higher levels of post braze strength with shorter aging times, preferably at room temperature, and that further exhibit good external and internal corrosion characteristics that can further be used in folded-tube configurations including but not limited to B-tube configurations.

SUMMARY OF THE INVENTION

Generally speaking, in accordance with the present invention, a four layer composite is provided that includes an interliner positioned between a braze clad layer of Aluminum Association ("AA") 4xxx series alloy and a core layer, and a sacrificial layer positioned on the opposite side of the core layer from the interliner.

The multi-layered brazing sheet including a core layer of an aluminum alloy composed of about 0.7-1.2 wt. % Cu, up to about 1.3 wt. % Si, up to about 1.9 wt. % Mn, up to about 0.7 wt. % Mg, up to about 0.2 wt. % Ti, and up to about 0.25 wt. % Fe, and incidental impurities; an interliner positioned on one side of the core layer, the interliner layer composed of an aluminum alloy including about 0.5-1.2 wt. % Cu, up to about 1.2 wt. % Si, up to about 0.25 wt. % Fe, up to about 1.9 wt. % Mn and up to about 0.25 wt. % Ti, and incidental impurities;

a braze clad layer positioned on the other side of the interliner, and a sacrificial layer positioned on the other side of the core layer opposite the interliner, the sacrificial layer composed of an aluminum alloy including up to about 1.2 wt. % Si, up to about 0.2 wt. % Cu, up to about 0.25 wt. % Fe, up to about 1.9 wt. % Mn, up to about 6 wt. % Zn, and incidental impurities.

In one embodiment, the multi-layered brazing sheet includes a core layer composed of an aluminum alloy including about 1.3-1.9 wt. % Mn, about 0.7-1.3 wt. % Si, about 0.7-1.2 wt. % Cu, about 0.3-0.7 wt. % Mg, about 0.07-0.2 wt. % Ti, about 0.05-0.25 wt. % Fe, and incidental impurities; an interliner positioned on one side of the core layer, the interliner including an aluminum alloy composed of about 1.3-1.9 wt. % Mn, about 0.7-1.2 wt. % Si, about 0.5-1.2 wt. % Cu, about 0.05-0.25 wt. % Fe, about 0.07-0.2 wt. % Ti, and incidental impurities; a braze clad layer positioned on the other side of the interliner, the braze clad layer composed of an aluminum alloy including about 5-15 wt. % Si, up to about 0.6 wt. % Fe, up to about 0.1 wt. % Mn, up to about 0.3 wt. % Cu, and incidental impurities; and a sacrificial layer positioned on the other side of the core layer opposite the interliner, the sacrificial layer composed of an aluminum alloy including about 4.0-6.0 wt. % Zn, about 0.7-1.9 wt. % Mn, about 0.7-1.2 wt. % Si, about 0.05-0.25 wt. % Fe, up to about 0.2 wt. % Cu, and incidental impurities.

In another aspect of the invention, a brazing process is provided that processes an aluminum alloy, such as the alloy described-above, to provide increased post braze strength with decreased aging time, while maintaining corrosion resistance. In one embodiment the brazing process includes the steps of: providing a multi-layered brazing sheet or a folded tube formed from the multi-layer brazing sheet having a core layer composed of about 0.7-1.2 wt. % Cu, up to about 1.3 wt. % Si, up to about 1.9 wt. % Mn, up to about 0.7 wt. % Mg, up to about 0.2 wt. % Ti and up to about 0.25 wt. % Fe, with the balance being Al and incidental impurities; an interliner positioned on one side of the core layer, the interliner layer composed of about 0.5-1.2 wt. % Cu, up to about 1.2 wt. % Si, up to about 0.25 wt. % Fe, up to about 1.9 wt. % Mn and up to about 0.2 wt. % Ti, with the balance being Al and incidental impurities, a braze clad layer positioned on the other side of the interliner layer, a sacrificial layer positioned on the other side of the core layer opposite the interliner, the sacrificial layer composed of up to about 1.2 wt. % Si, up to about 0.2 wt. % Cu, up to about 0.25 wt. % Fe, up to about 1.9 wt. % Mn and up to about 6 wt. % Zn, with the balance being Al and incidental impurities; heating the brazing sheet to above 450° C. for a period of up to about 20 minutes; and cooling the brazing sheet to a temperature below about 200° C. at a cooling rate greater than about 100° C. per minute.

BRIEF DESCRIPTION OF THE DRAWING

The following detailed description, given by way of example and not intended to limit the invention solely thereto, will best be appreciated in conjunction with the accompanying drawings, wherein like reference numerals denote like elements and parts, in which.

DETAILED DESCRIPTION OF PREFERRED EMBODIMENTS

Figure 1:
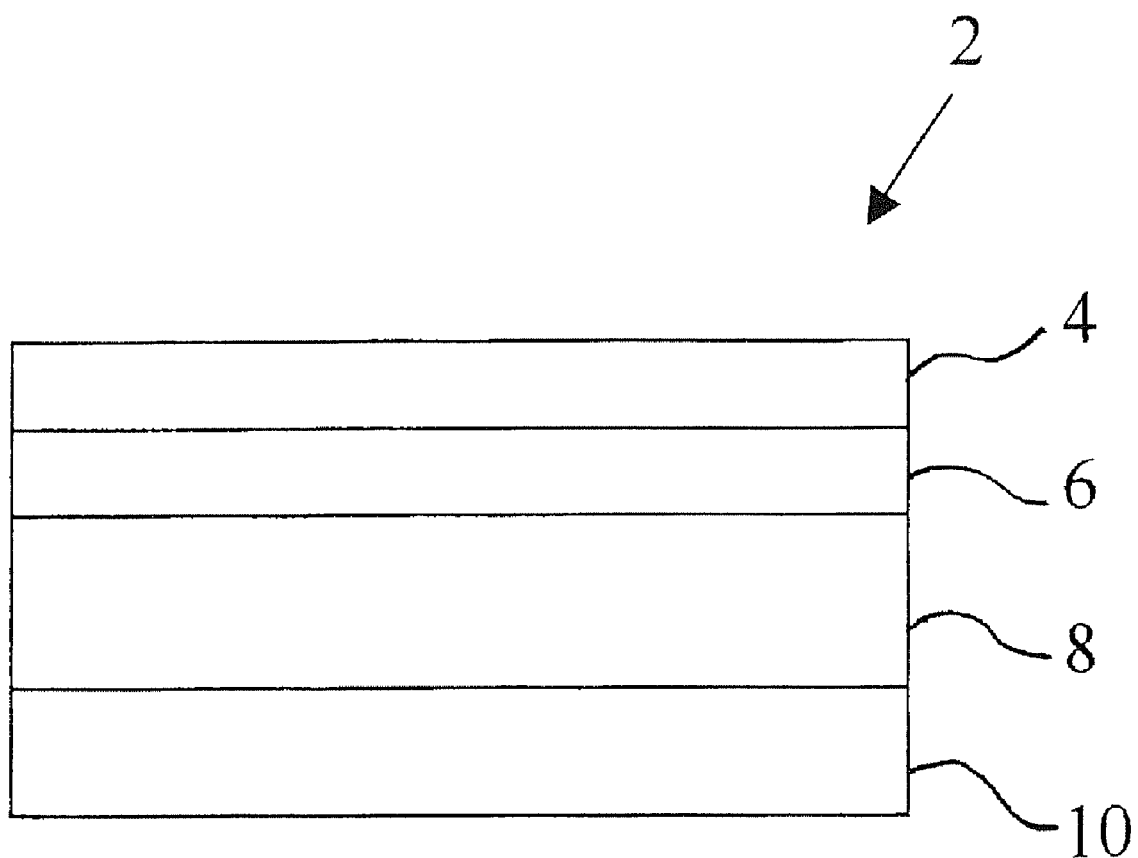
FIG. 1 is a schematic diagram showing the four distinct layers in a preferred embodiment of the brazing sheet of this invention.

FIG. 1 depicts a four layer aluminum brazing sheet product 2 that may be used in the fabrication of brazed heat exchangers, primarily for folded and/or welded type tubes used in header/tube type heat exchangers (e.g. radiators, heater cores and the like). The four layers refer to the compositionally and functionally significant layers of the composite product. All component percentages herein are by weight percent unless otherwise indicated. When referring to any numerical range of values, such ranges are understood to include each and every number and/or fraction between the stated range minimum and maximum. A range of about 5-15 wt. % Si, for example, would expressly include all intermediate values of about 5.1, 5.2, 5.3 and 5.5%, all the way up to and including 14.5, 14.7 and 14.9% Si. The same applies to each other numerical property, relative thickness and/or elemental range set forth herein. As used herein, the term "incidental impurities" refers to elements that are not purposeful additions to the alloy, but that due to impurities and/or leaching from contact with manufacturing equipment, trace quantities of such elements being no greater than 0.05 wt % may, nevertheless, find their way into the final alloy product.

The brazing sheet 2 may be fabricated via traditional roll bonding practices or other practices known in the art such as those described in U.S. Pat. No. 6,705,384 to Kilmer et al. entitled "Simultaneous Multi-Alloy Casting". If this practice is used, a thin (less than about 3% of the total composite thickness) divider alloy will be present between at least one and up to three of the interfaces between the four layers described herein. This divider alloy is at least 96% aluminum and serves as a separator/divider to minimize intermixing of the alloys on either side thereof during the casting process.

If one or more components of the sheet of the present invention are fabricated via the above described methods, then the sheet will have more than four compositionally distinct layers. The presence of the thin divider alloy does not significantly alter the behavior of the final product nor is it present to intentionally alter the mechanisms described herein. Therefore, all references to four layer products do not limit the invention to alloys without these dividers.

The multi-layered brazing sheet 2, depicted in FIG. 1, includes four layers, a core layer 8, a braze clad layer 4, an interliner 6 positioned between the braze clad layer 4 and the core layer 8, and a sacrificial layer 10 positioned on the opposite side of the core layer 8 from the interliner 6. The composite thickness of brazing sheet 2 preferably is up to about 350 microns at final gauge, more preferably about 120 to about 250 microns. Thicknesses can be supported up to 350 microns in applications wherein higher thicknesses are preferable, for example, in radiators of large trucks. The thicknesses of the interliner layer and sacrificial layer are each between about 10 to 25% of the thickness of the overall composite thickness. The braze clad layer 4 is preferably about 5-20% the thickness of the sheet.

The interliner 6 is clad on one side of the core layer 8 and the sacrificial layer 10 is clad on the opposing side of the core layer 8. The braze clad layer 4 (filler alloy) is clad onto the interliner layer 6. The filler alloy is any filler material known in the art, preferably an Al—Si filler material.

Preferably, the core layer 8 is composed of, by weight percent, 0.7-1.3% Si, 0.05-0.25% Fe, 0.7-1.2% Cu, 1.3-1.9% Mn, 0.3-0.7% Mg, 0.07-0.2% Ti with the balance being Al and incidental impurities. More preferably, the core layer 8 is comprised of, by weight percent, 0.8-1.1% Si, 0.05-0.15% Fe, 0.7-1.0% Cu, 1.4-1.8% Mn, 0.3-0.6% Mg, 0.10-0.18% Ti with the balance being Al and incidental impurities.

The Si content within the core layer 8 promotes strengthening by solid solution strengthening, by dispersion strengthening in combination with Mn in a dispersoid phase and further by promoting age hardening through combination with Mg and in some scenarios Cu to form $Mg_2Si$ or other strengthening precipitates. In the core layer 8 of the present invention, there are no restrictions in the relative concentration of Si in the core layer to that in the two adjoining layers. The Si in the core layer 8 can be, but does not need to be, higher than in both the adjoining layers.

The Cu content of the core layer 8 provides solid solution strengthening, potentially participates in age hardening reactions and raises the corrosion potential of the core layer 8 making it more noble from a corrosion standpoint than the braze clad 4 layer's surface and the sacrificial layer 10, which enhances the corrosion resistance of a tube formed from the brazing sheet 2. Mn strengthens aluminum by solid solution strengthening and by dispersion strengthening. Mg is added in very controlled levels to promote strength by a combination of solid solution strengthening and age hardening in conjunction with the Si and possibly with Cu. Ti is added for corrosion resistance. The Fe is an incidental impurity but is controlled to low levels for corrosion resistance. Thickness of the core layer 8 is preferably about 35% to 65% of the tube-stock thickness.

The interliner 6 includes, by weight percent, copper in the range of about 0.5-1.2%. In the preferred embodiment, interliner 6 comprises, by weight percent: 0.7-1.2% Si, 0.05-0.25% Fe, 0.5-1.2% Cu, 1.3-1.9% Mn, 0.07-0.2% Ti with the balance being Al and incidental impurities. More preferably, the interliner 6 is comprised of, by weight percent: 0.8-1.1% Si, 0.05-0.15% Fe, 0.7-1.0% Cu, 1.4-1.8% Mn, 0.10-0.18% Ti with the balance being Al and incidental impurities.

The Cu level of the interliner 6 is maintained between about 0.5 wt. % to about 1.2 wt % to promote high post braze strength while still maintaining very good brazing performance and corrosion resistance. The Cu level of the interliner 6 generates high post-braze strength in 4-layer composites, allowing for minimizing the amount of Mg in the core and thus optimizing brazing performance. It is particularly surprising that the higher Cu of the interliner 6 results in the combination of higher post braze strength, very good brazing performance and uncompromised external corrosion resistance, which is achievable with the present brazing sheet. The term "high post braze strength" denotes that the ultimate tensile strength (UTS) of the sheet 2 following brazing and natural aging at room temperature for a period of seven days is on the order of 190 MPa or greater. In light of the additional strength provided by the higher Cu content in the interliner 6, the Mg content in the core may be limited to low enough levels to maintain good brazing performance, while achieving desirable strength characteristics.

Very good brazing performance signifies that the sheet 2 may be brazed with normal flux loading, because the Mg-effect on the flux is minimized. One example of normal flux loading for CAB brazing includes mixtures of inorganic fluoride fluxes, such as potassium fluoro-aluminates, one commercial example of which being Nocolok flux, in which the flux is applied to the parts to be joined prior to brazing, wherein a typical flux loading for essentially Mg-free braze materials is about 3 to about 8 grams/sq.meter of area. It is noted that the above example is provided for illustrative purposes only and is not intended to limit the invention, wherein other fluxes and loading parameters have also been contemplated and are within the scope of the present invention. In addition to increasing post braze strength, the high Cu level in the interliner, does not compromise the external or internal corrosion resistance of the tube as measured by accelerated laboratory corrosion tests.

The Si content within the interliner 6 provides the same strengthening functions as for the core layer 8 and may further partake in age hardening of the tube after brazing by combining with Mg, wherein Mg diffuses from the core layer 8 to the interliner 6 during the braze cycle. Mn and Ti provide the same functions as they do in the core layer 8. Thickness of the interliner 6 is preferably about 20 to 70 microns.

Sacrificial layer 10 is preferably composed of, by weight percent: 0.7-1.2% Si, 0.05-0.25% Fe, up to 0.2% Cu, 0.7-1.9% Mn, 4-6% Zn with the balance being Al and incidental impurities. More preferably, the sacrificial layer 10 is comprised of, by weight percent: 0.7-1.1% Si, 0.05-0.15% Fe, less than 0.10% Cu, 0.9-1.7% Mn, 4-5.5% Zn with the balance being Al and incidental impurities. The Si and Mn provide the same strengthening functions as they do for the interliner 6. The Zn is present primarily to shift the corrosion potential of the sacrificial layer 10 in the more active direction so it will provide cathodic protection to the underlying core 8 during service. Thickness of the sacrificial layer 10 is preferably about 20 to 70 microns.

Braze clad layer 4 is composed of an Aluminum Association (AA) 4xxx alloy, preferably including 5-15 wt. % Si, up to about 0.6 wt. % Fe, up to about 0.1 wt. % Mn, up to about 0.3 wt. % Cu, and incidental impurities. Preferably, the braze clad layer 4 includes about 5-15 wt % Si, 0.1-0.4 wt. % Fe, about 0.01-0.1 wt. % Mn and about 0.01-0.3 wt. % Cu. Thickness of the braze clad layer 4 preferably ranges from about 25 to 50 microns.

During the brazing process, the brazing sheet 2, which may be in the form of a folded tube or B-tube formed from the tubestock, is exposed to high temperatures for a period of time that allows for a significant amount of elemental diffusion between the layers of the brazing sheet 2. In particular, elements with high solubility and mobility in aluminum will diffuse between the layers, most particularly Cu, Si, Mg and Zn. The thickness of the interliner 6 and the sacrificial layer 10 are selected to prevent the Mg levels at the surfaces of the tube from becoming so high during the brazing process that it will interfere with brazing. The necessary thickness of these layers will be dependent upon the amount of Mg in the core layer and the specific thermal exposure during the braze cycle.

In one example, when the thermal exposure during the braze cycle involves a thermal exposure on the order of 5 to 10 minutes above a temperature of about 450° C, in order to ensure that the Mg content at the surface of the sheet or tube does not affect brazing when the Mg content of the core layer 8 is on the order of about 0.4 wt %, the interliner 6 should have a thickness on the order of about 30 microns, and the sacrificial layer should have a thickness on the order of about 30 microns.

It is noted that the above example is provided for illustrative purposes only, and it has been contemplated that when the thermal exposure and/or Mg content in the core layer 8 is decreased that the thickness of the interliner 6 and sacrificial layer 10 may also be decreased, while still restricting the amount of Mg that reaches the sheet or tube surface thus providing acceptable brazing. It is also within the scope of the present invention, that in order to limit the concentration of Mg at the surface of the tube or sheet when the Mg content in the core layer 8 and/or thermal cycle is increased that the thickness of the interliner 6 and sacrificial layer 10 may also be increased in order to maintain the same level of brazing performance.

It is preferred to have a high level of Zn in the sacrificial layer 10 after brazing so that it maintains its active corrosion potential relative to the core layer 8. In one embodiment, the Zn content of the sacrificial layer 10 after brazing is on the order of about 2 to 3 wt %. To account for this, the thickness of the sacrificial layer 10 and its composition must be carefully selected to provide the required level of cathodic protection for the underlying core layer 8 after being exposed to a given braze cycle. In one example, in order to provide a Zn concentration of approximately 2.5 wt % within the sacrificial layer 10 after brazing and hence provide the required level of cathodic protection for the underlying core layer 8, the sacrificial layer 10 has a thickness on the order of about 30 microns and a Zn concentration of approximately 4.5 wt % prior to brazing.

The post-braze strength of the brazing sheet 2 is optimized by controlling the manganese (Mn), silicon (Si), copper (Cu) and magnesium (Mg) contents of the core layer 8, the Mn, Si and Cu contents of the interliner 6 and the Mn and Si content of the sacrificial layer 10. The brazing sheet 2 maintains good external corrosion resistance, while optimizing post-braze strength, by utilizing high Cu levels (about 0.5%-1.2%) in the interliner 6. The interliner 6 and sacrificial layer 10 of the brazing sheet 2 contain low or no magnesium to maintain the braze-ability of the product in CAB brazing with normal flux loadings.

Another aspect of the present invention is a process for a brazing operation utilizing the above described brazing sheet 2. In accordance with the inventive process, it has been determined that increased post braze strength following natural aging, corrosion resistance and brazeability is achieved with the above-described brazing sheet when processed to control interdiffusion between the various layers during brazing and to maintain Mg and Si in solid solution during the cool down from the brazing temperature for precipitate hardening during natural or artificial aging.

As a means of limiting the interdiffusion amongst the various layers in the brazing sheet 2, a shortened brazing cycle has been found to be beneficial. By limiting the interdiffusion, the various layers of the brazing sheet maintain more of their distinct character and therefore are more effective in providing the strength and corrosion resistance they were designed for. For that reason the exposure time of the brazing sheet above 450° C. during the braze cycle is preferably kept to 20 minutes or less. In a preferred embodiment of the braze cycle for the brazing sheet 2, the time spent above 450° C. during the braze cycle is 12 minutes or less.

In addition, since the brazing sheet 2 of the invention is intended to strengthen by age-hardening after brazing, the cooling rate from the braze soak temperature is an important parameter to control. In one embodiment, the braze soak temperature ranges from about 585 to about 615° C., and is preferably about 595° C. Specifically, the cooling rate from the braze soak temperature is selected to ensure that precipitate hardening elements, such as Mg, Cu and Si, remain in solid solution until age hardening process steps. Slow cooling rates from the braze temperature disadvantageously allows for heterogeneous precipitation of $Mg_2Si$ or other phases on dispersoid particles or other interfaces in the microstructure where they do not result in increased strength. Rapidly cooling the brazing sheet 2 from the braze soak temperature to below about 200° C., advantageously ensures that the majority of Mg, Si and Cu are kept in solid solution and are therefore available for precipitation as fine strengthening precipitates during natural or artificial aging. The preferred cooling rate from the braze temperature is above about 100° C. per minute, more preferably above about 150° C. per minute.

In one embodiment, a tube formed from the brazing sheet 2 will strengthen after brazing by natural aging at substantially room temperature to levels that were not possible in prior brazing sheets that were easily CAB brazeable. The brazing sheet 2 of the present invention increases the post braze strength of the brazing sheet 2 with the incorporation of Cu, and therefore allows for reduced Mg content. In accordance with the above-described process, the post braze ultimate tensile strength (UTS) of a tube formed from the brazing sheet 2 approaches or exceeds 200 MPa, preferably exceeding 220 MPa, after an aging period of about seven days at substantially room temperature.

The high Cu interliner 6 of this invention, when coupled to a magnesium-containing core layer 8, dramatically enhances the overall combination of braze-ability, post-braze UTS and corrosion resistance of a 4-layer composite brazing sheet 2, such as tubestock or tube from such a tubestock. In contrast to the existing art that requires increased Mg content to achieve similar strength levels, the inventive sheet and process achieves increased strength, corrosion and braze-ability performance in folded tube configurations by incorporating higher Cu levels in the interliner 6, and by defining parameters of the brazing cycle necessary for realization of optimum post-braze properties. Using the above brazing sheet 2 and process, a tube may be provided by the brazing sheet 2 folded into a configuration in which a seam along a length of the tube is sealed during a CAB brazing operation involving a flux. The current invention defines a distinctly different invention that offers a notably higher combination of post-braze properties without sacrificing braze-ability during the CAB process.

Although the invention has been described generally above, the following examples are provided to further illustrate the present invention and demonstrate some advantages that arise therefrom. It is not intended that the invention be limited to the specific examples disclosed.

EXAMPLE 1

Table 1 below shows compositions of components, namely core layers, interliners and sacrificial layers, from which 4-layer composite tubestock brazing sheets were fabricated. The components were fabricated in accordance with the invention, with the exception of interliner designated AIL1, which had low copper.

TABLE 1

| Component | Designation | Si | Fe | Cu | Mn | Mg | Ti | Zn |
|---|---|---|---|---|---|---|---|---|
| Core | AC1 | 0.92 | 0.18 | 0.78 | 1.2 | 0.56 | 0.15 | 0 |
|  | AC2 | 0.89 | 0.18 | 0.91 | 1.53 | 0.59 | 0.15 | 0 |
|  | KC1 | 0.83 |  | 0.84 | 1.61 | 0.38 | 0.14 | 0 |
| Interliner | AIL1 | 0.76 | 0.2 | 0.22 | 1.19 | 0 | 0.16 | 0 |
|  | AIL2 | 0.79 | 0.19 | 0.52 | 1.56 | 0 | 0.16 | 0 |
|  | KIL3 | 0.87 |  | 0.84 | 1.57 | 0 | 0.14 | 0 |
|  | KIL4 | 1.01 |  | 0.94 | 1.6 | 0 | 0.13 | 0 |
| Sacrificial | AS1 | 0.81 | 0.18 | 0 | 1.0 | 0 | 0.003 | 4.05 |
|  | AS2 | 0.82 | 0.18 | 0.01 | 1.21 | 0 | 0.009 | 4.06 |
|  | KS3 | 0.87 |  |  | 0.98 |  |  | 4.54 |
|  | KS4 | 0.99 |  |  | 1.2 |  |  | 4.98 |

As shown in Table 2, brazing sheet composites were fabricated from the above components. Composites A, B and C were fabricated at 200 micron thickness. Composite D, which did not conform to the present invention because of the low Cu content of component AIL1, was fabricated at 150 micron thickness. The difference in thickness of composite D relative to the composites A, B and C did not impact the results.

TABLE 2

| Composite | Braze liner | | Interliner | | Core | | Sacrificial | |
|---|---|---|---|---|---|---|---|---|
| | Alloy | clad % | Alloy | clad % | Alloy | clad % | Alloy | clad % |
| A | AA 4045 | 17 | KIL3 | 15 | KC1 | 53 | KS3 | 15 |
| B | AA 4045 | 15 | KIL4 | 20 | KC1 | 50 | KS4 | 15 |
| C | AA 4045 | 15 | AIL2 | 20 | AC2 | 47 | AS2 | 18 |
| D | AA 4045 | 16 | AIL1 | 27 | AC1 | 37 | AS1 | 20 |

Composites A, B, C and D materials were subjected to a simulated braze thermal cycle that exposed the materials to temperatures above 450° C. for less than 10 minutes, with a peak temperature of approximately 595° C. and a cooling rate of approximately 110° C./min. Post-braze tensile properties of the composites are shown in Table 3.

TABLE 3

| | Brazed + 7days @ R.T. | | |
|---|---|---|---|
| Composite | UTS (MPa) | YS (MPa) | el. (%) |
| A | 230 | 94 | 14 |
| B | 230 | 92 | 15 |
| C | 239 | 107 | 11 |
| D | 195 | 74 | 13 |

Table 3 shows the post-braze strength advantage of composite structures A, B, and C over composite D that has lower Cu in the interliner component, even though composite D has a core alloy with a very high Mg content. While it might be argued that the core alloy in composite D is thinner than in the other composites, by virtue of its higher core Mg content, the total amount of Mg in composite D is virtually the same as that in composites A and B, yet it has markedly lower strength. Further, the post-braze strength of composite C is quite high with the Si content of the core being higher than that of both the interliner and sacrificial layer.

The above composites all demonstrate relatively excellent brazing performance. In particular, composites A and B, because of lower Mg content of their cores have demonstrated excellent brazing performance. The braze-ability of composite A has been confirmed in prototype radiator fabrication utilizing folded tubes of composite A tubestock.

All the above composites have exhibited good to excellent resistance to external corrosion in accelerated laboratory tests. Coupons of each tubestock were brazed to fins that are more electrochemically active than the tubes. The sacrificial layer surface of the composites were masked off with tape and the fin/residual braze surface of the coupons were exposed in a corrosion cabinet to a repeated cyclic misting cycle/drying cycle/high humidity cycle. The misting solution was a proprietary aqueous, acidic, corrosive solution. None of the tubestocks exhibited perforation after 1500 hrs exposure which was the maximum length of test exposure. Internal corrosion tests involving exposure of the sacrificial layer of the composite to a proprietary heated corrosive water solution for extended periods of time have also confirmed that the above composites demonstrate good to excellent internal corrosion resistance. In particular, composites A and B have survived extensive times in test with little or no attack of the core alloy due to the cathodic protection provided by the sacrificial layers.

While many combinations of core, interliner and sacrificial layers were investigated, the previous examples were chosen to illustrate particular findings. It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A multi-layered brazing sheet comprising:
    a core layer comprising of about 0.7-1.2 wt. % Cu, up to about 1.3 wt. % Si, up to about 1.9 wt. % Mn, up to about 0.7 wt. % Mg, up to about 0.2 wt. % Ti, up to about 0.25 wt. % Fe, and a balance of Al and incidental impurities;
    an interliner positioned on one side of the core layer, the interliner comprised of about 0.5-1.2 wt. % Cu, up to about 1.2 wt. % Si, up to about 0.25 wt. % Fe, up to about 1.9 wt. % Mn, up to about 0.2 wt. % Ti, and a balance of Al and incidental impurities;
    a braze clad layer positioned on the other side of the interliner layer, and a sacrificial layer positioned on the other side of the core layer opposite the interliner, the sacrificial layer comprised of about 0.7-1.2 wt. % Si, up to about 0.2 wt. % Cu, up to about 0.25 wt. % Fe, about 0.7-1.9 wt. % Mn, up to about 6 wt. % Zn, and a balance of Al and incidental impurities.

2. The brazing sheet of claim 1 wherein the braze clad layer is composed of an alloy comprising about 5-15 wt. % Si, up to about 0.6 wt. % Fe, up to about 0.1 wt. % Mn, and up to about 0.3 wt. % Cu.

3. The brazing sheet of claim 2 wherein said the alloy of the braze clad layer comprises about 5-15 wt % Si, 0.1-0.4 wt. % Fe, about 0.01-0.1 wt. % Mn and about 0.01-0.3 wt. % Cu.

4. The brazing sheet of claim 1 wherein the interliner comprises about 0.7-1.2 wt. % Si, about 0.05-0.25 wt. % Fe, about 0.5-1.2 wt. % Cu, about 1.3-1.9 wt. % Mn, and about 0.07-0.2 wt. % Ti.

5. The brazing sheet of claim 1 wherein the sacrificial layer comprises about 0.05-0.25 wt. % Fe, up to about 0.2 wt. % Cu, and about 4-6 wt. % Zn.

6. The brazing sheet of claim 1 wherein the core layer comprises about 0.7-1.3 wt. % Si, about 0.7-1.2 wt. % Cu, about 1.3-1.9 wt. % Mn, about 0.3-0.7 wt. % Mg, about 0.07-0.2 wt. % Ti, and about 0.05-0.25 wt. % Fe.

7. The brazing sheet of claim 1 wherein the brazing sheet has a thickness up to about 350 microns.

8. The brazing sheet of claim 7 wherein the brazing sheet has a thickness of about 120 to about 250 microns.

9. The brazing sheet of claim 1 wherein the post-braze ultimate tensile strength of the sheet exceeds about 200 MPa when aged for at least seven days at about room temperature.

10. A tubestock comprising the brazing sheet of claim 1.

11. A tube comprising the brazing sheet of claim 1 folded into a configuration in which a seam along a length of the tube is sealed during a CAB brazing operation, the CAB brazing operation involving a flux.

12. A multi-layered brazing sheet comprising:
    a core layer comprised of an aluminum alloy comprising about 1.3-1.9 wt. % Mn, about 0.7-1.3 wt. % Si, about 0.7-1.2 wt. % Cu, about 0.3-0.7 wt. % Mg, about 0.07-0.2 wt. % Ti, about 0.05-0.25 wt. % Fe, and incidental impurities;
    an interliner positioned on one side of the core layer, the interliner comprised of an aluminum alloy comprising about 1.3-1.9 wt. % Mn, about 0.7-1.2 wt. % Si, about 0.5-1.2 wt. % Cu, about 0.05-0.25 wt. % Fe, about 0.07-0.2 wt. % Ti, and incidental impurities;

a braze clad layer positioned on the other side of the interliner, the braze clad layer comprising an aluminum alloy comprising 5-15 wt. % Si, up to about 0.6 wt. % Fe, up to about 0.1 wt. % Mn, up to about 0.3 wt. % Cu, and incidental impurities; and a sacrificial layer positioned on the other side of the core layer opposite the interliner, the sacrificial layer comprising an aluminum alloy comprising about 4.0-6.0 wt. % Zn, about 0.7-1.9 wt. % Mn, 0.7-1.2 wt. % Si, about 0.05-0.25 wt. % Fe, up to about 0.2 wt. % Cu and incidental impurities.

13. The brazing sheet of claim 12 wherein the brazing sheet is up to about 350 microns thick.

14. The brazing sheet of claim 12 wherein the post-braze ultimate tensile strength of the sheet exceeds about 200 MPa after aging for about seven days at about room temperature.

* * * * *